United States Patent Office 3,781,348
Patented Dec. 25, 1973

3,781,348
PROCESS FOR THE PRODUCTION
OF THIOCORNINE
Kiyoshi Kominato and Yutaka Kominato, both of 15, Hagigakakiuchicho, Shimokamo Sakyo-ku, Kyoto-shi, Japan
No Drawing. Original application Nov. 4, 1968, Ser. No. 773,294, now Patent No. 3,626,003. Divided and this application Nov. 6, 1970, Ser. No. 87,608
Claims priority, application Japan, Nov. 8, 1967, 42/71,834
Int. Cl. C07c 101/04
U.S. Cl. 260—534 S                 8 Claims

ABSTRACT OF THE DISCLOSURE

Thiocornine, an amino acid, and thiamamidine phosphoric cysteine are obtained from vegetable sources, e.g. Allium plants, or animal sources. The compounds are therapeutically useful.

---

This application is a Rule 147 division of Ser. No. 773,294, filed Nov. 4, 1968, and now U.S. Pat. 3,626,003.

The present invention provides a process for separately preparing (a) a new amino acid, thiocornine, which is used as a material for synthesizing an available component of garlic or for biosynthesis and (b) thiamamidine phosphoric cysteine which is used as a material for synthesizing methionine or for biosynthesis, and the process has the characteristic features that the starting materials include animals and plants in general, especially genus Allium plants, beer yeast, and the pressed cake of general fermentation products of plant and internal organs of animals, which are treated (grease is removed beforehand in case of animal organs) with methanol (or ethanol) to extract effective components and the extract is concentrated by evaporation, then the ingredient is hydrolyzed by being heated with added sulfuric acid in per se conventional manner, and subsequently it is brought into an aqueous solution after the acid has been removed, and then the thiamamidine phosphoric cysteine is adsorbed completely on added active charcoal while the thiocornine remains in the solution, the former being desorbed from the charcoal with methanol or ethanol and the eluant being evaporated into syrup form to obtain a concentrated liquid, and the filtrate containing the latter component being made alkaline with a suitable base, such as ammonia, barium hydroxide or caustic alkali, and kept standing in a cool place for a while with a little ethanol added until a precipitate is formed to which enough hydrochloric acid is added to make the solution acid to form crystals of thiocornine in a short time.

The moiety of the new amino acid, thiocornine, which is represented by structural formula below, is found extensively in nature as a component of the thiamamidine derivatives, which presumably belong to an enzymatic system or to a new vitamin, along with thiamamidine phosphoric cysteine (abbreviated hereinafter as T.P.C.).

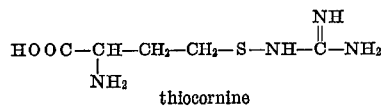
thiocornine

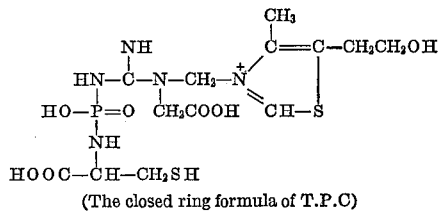
(The closed ring formula of T.P.C)

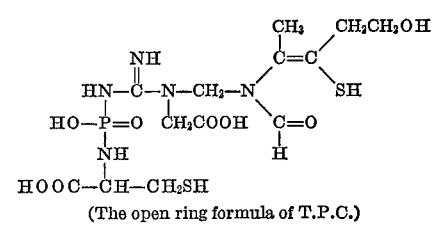
(The open ring formula of T.P.C.)

The thiocornine moiety occurs in nature in the protein part of thiamamidine derivatives or as a component acid of peptides, and thiocornine is isolated by hydrolysis. It is very unstable in the isolated state, thus is decomposed into homocysteine and urea as is expressed by the following scheme:

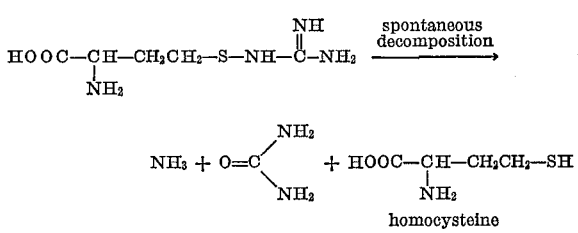

The compound thiocornine, however, is stable in the form of peptide or hydrochloride. It has become evident that homocysteine, which is seldom found in nature, is an important substance when the essential amino acid methionine is formed in the human body from substances such as choline or betaine in the presence of methyl transfer enzyme. Consequently, the thiocornine moiety is considered to be the only origin of homocysteine in nature.

Further T.P.C., to which discovery the present inventors devoted themselves for as long as 45 years, is a fundamental functional group in the composition of thiamamidine derivatives and is expressed by the molecular formula shown above. The distribution of the compound moiety in nature in the form of thiamamidine derivatives covers almost all foods and plays an important role in the taste and nutrition of the foods. For the sake of illustration, the chemical structural formulae are shown below of scordinines as an effective component of garlic. Meanwhile there are various kinds of scordinines, such as scordinine A₁, scordinine A₂, etc., depending on the number and the order of the amino acids in the composition of peptide.

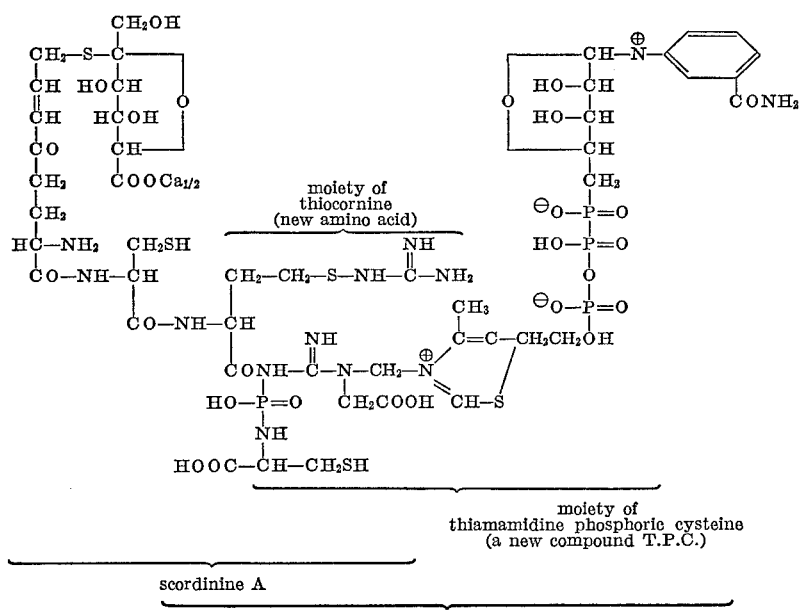

Further, the present invention substance thiocornine is also useful for fat removal of fatty livers and for strengthening livers, and thiamamidine phosphoric cysteine acts as cofactor (just like vitamin), and each of the substances can be administered to patients by hypodermic or venous injection in an amount of 50 mg. ×2 per day or orally in an amount of 100 mg. ×2 per day.

The animal test of thiocornine rehindrance effect of fatty liver formation was made as described infra.

(1) Method of the test

Thirty male albino rats, each about 100 g. in weight, were separated into three groups. Each group contained ten rats. The first group was controlled, the second was the fatty liver group, and the third was the thiocornine dosage group. (After the test more healthy fine rats were chosen from each group, and liver fat was measured.)

Compound feed and water were given to the control group; feed containing orotic acid in the ratio of two percent by weight and water were given to fatty liver group and the thiocornine group. More than 25 mg. of thiocornine (dissolved in 0.5 ml. of water) was injected intraperitoneally every day. Twenty days after the test of the thiocornine group, the rats were killed, blood recovered, liver picked out, and fat weighed and measured. The measurement of fat was done by the following general method, but to do more complete extraction the residue was extracted again warm, extracted solution was collected, concentrated, weighed.

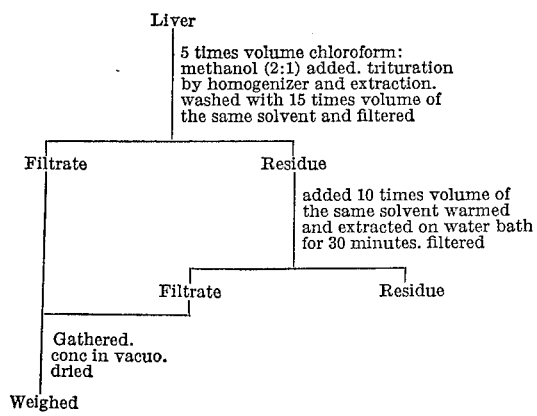

TABLE 1

| | Liver weight (g.) | Fat weight (g.) | Contained weight of fat (percent) | Increasing ratio of fat [1] (percent) |
|---|---|---|---|---|
| Thiocornine dosage group: | | | | |
| 1 | 5.25 | 0.3136 | 5.59 | |
| 2 | 5.70 | 0.3260 | 5.72 | |
| 3 | 5.75 | 0.3374 | 5.86 | |
| 4 | 5.60 | 0.3348 | 5.98 | |
| 5 | 4.60 | 0.2642 | 5.44 | |
| Average | 5.38 | 0.3152 | 5.85 | 54.2 |
| Fatty liver group: | | | | |
| 1 | 5.80 | 0.3542 | 6.10 | |
| 2 | 5.20 | 0.2472 | 4.75 | |
| 3 | 5.69 | 0.3545 | 6.23 | |
| 4 | 4.81 | 0.2748 | 5.71 | |
| 5 | 4.50 | 0.3969 | 8.82 | |
| Average | 5.20 | 0.3255 | 6.72 | 100 |
| Control group: | | | | |
| 1 | 5.20 | 0.2531 | 4.86 | |
| 2 | 5.41 | 0.2729 | 5.04 | |
| 3 | 5.19 | 0.2210 | 4.25 | |
| 4 | 4.66 | 0.2022 | 4.33 | |
| 5 | 4.54 | 0.2573 | 5.66 | |
| Average | 5.00 | 0.2413 | 4.82 | 0 |

[1] See the following equation:

Increasing ratio of fat $$= \frac{\text{Avg. of thiocornine group} - \text{Avg. of control group}}{\text{Avg. of fatty liver group} - \text{Avg. of control group}} \times 100$$

The results of the acute toxicity test of the inventive substance thiocornine are set forth infra.

(1) Animals tested: Male and female mice of dd-series were employed. They were bred in a breeding chamber at 23° C. with solid food and city water, but they were kept without food and water for 3 hours before the administration of thiocornine. After the administration symptoms in general were observed and as for dead individuals visual observation of organs was carried out at dissection. The $LD_{50}$ values was calculated, according to the Behrens-Kärber method, from the number of mice that died within 5 days.

(2) Administration and dose: Thiocornine was given to male and female mice by intra-abdominal injection (i.p.). Solutions prepared by dissolving 100, 80, 60, 40 and 20 mg. per individual of thiocornine each in 1 ml. of physiological salt solutino was injected. Controls were those to whom 1 ml. of physiological salt solution was plainly injected.

Six members were used to each group of different doses and 3 members for control.

Results

Approximately 30 minutes after the intra-abdominal injection first general symptoms appeared, such as inactivated motion, erected hairs, increased respiration frequency, etc. and further the more the dose, the more remarkable the symptoms. Death was first observed 8 hours after the administration and continued for 5 days, meaning the inclination of delayed effectiveness of thiocoronine. The rest of mice recovered to almost normal condition. The $LD_{50}$ values are shown in Table 2, that is 3.0 g./kg. for male and 3.2 g./kg. for female, which indicates no distinct difference between the sexes.

TABLE 2.—TEST CONDUCTED ON MICE

[Intra-abdominal injection, male mice of dd-series, 21.2 g. weight]

| Days | Number of the alive | | | | | |
|---|---|---|---|---|---|---|
| | 0 | 1 | 2 | 3 | 5 | 7 |
| Dose of thiocornine: | | | | | | |
| 100 mg. (in 1 ml.) | 6/6 | 3/6 | 3/6 | 2/6 | 0/6 | 0/6 |
| 80 mg. (in 1 ml.) | 6/6 | 6/6 | 3/6 | 1/6 | 1/6 | 1/6 |
| 60 mg. (in 1 ml.) | 6/6 | 5/6 | 5/6 | 4/6 | 3/6 | 3/6 |
| 40 mg. (in 1 ml.) | 6/6 | 6/6 | 6/6 | 6/6 | 6/6 | 6/6 |
| 20 mg. (in 1 ml.) | 6/6 | 6/6 | 6/6 | 6/6 | 6/6 | 6/6 |
| Physiological salt solution (1 ml.) | 3/3 | 3/3 | 3/3 | 3/3 | 3/3 | 3/3 |

NOTE.—$LD_{50}$=3.0 g./kg. calculated by the Behrens-Korber method.

[Intra-abdominal injection, female mice of dd-series, 19.7 g. weight]

| Days | Number of the alive | | | | | |
|---|---|---|---|---|---|---|
| | 0 | 1 | 2 | 3 | 5 | 7 |
| Dose of thiocornine: | | | | | | |
| 100 mg. (in 1 ml.) | 6/6 | 3/6 | 2/6 | 1/6 | 0/6 | 0/6 |
| 80 mg. (in 1 ml.) | 6/6 | 4/6 | 3/6 | 3/6 | 1/6 | 1/6 |
| 60 mg. (in 1 ml.) | 6/6 | 6/6 | 5/6 | 3/6 | 3/6 | 3/6 |
| 40 mg. (in 1 ml.) | 6/6 | 6/6 | 6/6 | 6/6 | 6/6 | 6/6 |
| 20 mg. (in 1 ml.) | 6/6 | 6/6 | 6/6 | 6/6 | 6/6 | 6/6 |
| Physiological salt solution (1 ml.) | 3/3 | 3/3 | 3/3 | 3/3 | 3/3 | 3/3 |

NOTE.—$LD_{50}$=3.2 g./kg.

ACUTE TOXICITY TEST OF THIAMAMIDINE PHOSPHORIC CYSTEINE

The results of the acute toxicity test of thiamamidine phosphoric cysteine when applied to mouse are as follows:

Procedure (1) Animals: Male and female mice of the dd-series were used. They had been fed with solid food and tap water and were forced to abstain from food and water from 3 hours on before the administration of thiamamidine phosphoric cysteine. After the administration, general symptoms were obtained, while the dead members were dissected to examine their organs by visual observation. $LD_{50}$ was calculated by the Behrens-Kärber method on the basis of the number of dead within 72 hours.

(2) Administration and dose: Intraabdominal injection (i.p.) was given to male and female mice. Each 1 ml. of physiological salt solutions which contain 90, 70, 50, 30 and 10 mg. per individual animal was injected and, on the other hand, 1 ml. of physiological salt solution alone to a control group. A group of 6 members of the animals was used for each dose and 3 for the control group.

Results

The general symptoms such as degraded movement, erected hair, increase of the respiration frequency, etc. were noticed at 30 minutes onward after the administration by intraabdominal injection, where the more the dose, the more remarkable the symptoms. All the members who were led to death died at 8–48 hours after the administration, while the remainder of the animals gradually recovered and almost recovered their normal condition in 48 hours. Further, no remarkable abnormality was noticed in any organ of the dead members by visual observation. The $LD_{50}$ values were 2.9 and 3.0 g./kg. for the male and the female, respectively, and no significant difference was observed between male and female.

TABLE 3.—ADMINISTRATION OF THIAMAMIDINE PHOSPHORIC CYSTEINE TO MICE

[Intraabdominal injection, mice of the dd-series, male, 19.5 g. weight]
(a)

| Days | Ratio of the alive to the total | | | | | |
|---|---|---|---|---|---|---|
| | 0 | 1 | 2 | 3 | 5 | 7 |
| Dose: | | | | | | |
| 90 mg. (1 ml.) | 6/6 | 0/6 | 0/6 | 0/6 | 0/6 | 0/6 |
| 70 mg. (1 ml.) | 6/6 | 2/6 | 2/6 | 2/6 | 2/6 | 2/6 |
| 50 mg. (1 ml.) | 6/6 | 4/6 | 4/6 | 4/6 | 4/6 | 4/6 |
| 30 mg. (1 ml.) | 6/6 | 5/6 | 5/6 | 5/6 | 5/6 | 5/6 |
| 10 mg. (1 ml.) | 6/6 | 6/6 | 6/6 | 6/6 | 6/6 | 6/6 |
| Physiological salt solution (1 ml.) | 3/3 | 3/3 | 3/3 | 3/3 | 3/3 | 3/3 |

NOTE.—$LD_{50}$=2.9 g./kg. as calculated by the Behrens-Köber method.

[Intraabdominal injection, mice of the dd-series; females, 18.8 g. weight]
(b)

| Days | Ratio of the alive to the total | | | | | |
|---|---|---|---|---|---|---|
| | 0 | 1 | 2 | 3 | 5 | 7 |
| Dose: | | | | | | |
| 90 mg. (1 ml.) | 6/6 | 0/6 | 0/6 | 0/6 | 0/6 | 0/6 |
| 70 mg. (1 ml.) | 6/6 | 3/6 | 2/6 | 2/6 | 2/6 | 2/6 |
| 50 mg. (1 ml.) | 6/6 | 4/6 | 4/6 | 4/6 | 4/6 | 4/6 |
| 30 mg. (1 ml.) | 6/6 | 5/6 | 5/6 | 5/6 | 5/6 | 5/6 |
| 10 mg. (1 ml.) | 6/6 | 6/6 | 6/6 | 6/6 | 6/6 | 6/6 |
| Physiological salt solution (1 ml.) | 3/3 | 3/3 | 3/3 | 3/3 | 3/3 | 3/3 |

NOTE.—$LD_{50}$=3.0 g./kg.

Summary

The acute toxicity of thiamamidine phosphoric cysteine was tested on male and female, separately, of mice by intraabdominal injection. Members of each administration group showed common symptoms such as degraded movement, increase of respiration frequency and erected hair. Among them the members led to death died in 8–48 hours after the administration, while others gradually recovered and the normal condition almost restored in 48 hours. Direct cause of death is unknown and no remarkable abnormality was noticed in any organ of the dead members by visual observation. So far as the calculated values of $LD_{50}$ are concerned, no significant difference was observed between male and female.

As examples of this invention the outline of the method of isolation will be described below.

EXAMPLE 1

Isolation and extraction from plant species (e.g. garlic, leek and onion of genus Allium plant), beer pressed cake, bran and residue of soy bean Cloves in case of garlic and onion, and stems in case of leeks were used as such for the starting material. At first they were cut or ground into small pieces, then thoroughly ground. The mixture was kept at room temperature or in a room below 40° C. for several hours, during which period glucoside as well as condensation part hydrolyzing enzymes, or in other words enzymes which attack glucoside of perfume ingredients with sugar and the condensation part of perfume ingredients with peptide, were entirely decomposed. When the perfume ingredients were needed, they were collected by steam distillation or extracted with such solvents as hexane, petroleum, etc. After the perfume ingredients had been removed, the remainder was used as the raw material of this invention. In the following example the scale was for 10 kg. of the material. The material contained in general 60–70% water. Either without any pretreatment or after being gently heated to expel most water, it was placed in a vessel equipped with a stirring device, and an adequate amount of methanol was added so that the content of methanol was close to 60%. The whole mixture was stirred for several hours, particularly while at 35–40° C. in winter. Contaminate matters in the leached liquid were removed by centrifugation, and the remaining solution was subjected to filtration to obtain a dark brown transparent filtrate. It was then evaporated until specific gravity 1.1–1.12 was reached and hydrolysis treatment was carried out with 2 liters of 28% sulfuric acid added for 10 hours in the usual process with superheated steam. Humin substance was formed as black precipitate which was filtered off. To the resulting solution, first barium carbonates and secondly barium hydroxide were added, taking care of the bubbles of carbon dioxide, to completely remove sulfuric acid, and the remaining dark brown solution of slightly acidic reaction was evaporated under reduced pressure to specific gravity 1.15–1.20. To the concentrated solution 1.8–2.0 kg. of active charcoal was added and the mixture was cooled with water under stirring for 10 hours in which period the whole T.P.C. was adsorbed onto the charcoal. The charcoal was filtered off to separate it from the filtrate containing thiocornine.

The desorption of T.P.C. from charcoal proceeded in such a way that the charcoal and 3–4 liters of methanol were placed in a vessel equipped with a counter-current cooler and treated below 60° C. for 10 hours. When the solvent was recovered, 5–6 g. of syrup containing crude T.P.C. was obtained. Since a small amount of sugar and amino acids as impurities was found in the syrup, it was dissolved under grinding into pure methanol, and the solution was warmed with active charcoal at about 60° C. for decoloration. The methanolic solution was evaporated under reduced pressure at a temperature below 60° C. under nitrogen bubbling, when crystals of T.P.C. separated gradually. The whole mixture was kept standing in an ice room for 1–2 days to secure complete crystallization. The crystals were in plates or prisms and the yield was 5–6 g. The closed-ring form had the maximum ultraviolet absorption at 275 or 278 m$\mu$, while the open-ring form did not absorb. The reactions they exhibited were (1) Prebludas' reaction
(2) Weyls' reaction
(3) Sakaguchi's reaction (Creatine and thiazol reactions).

The open-ring form showed, in addition to the above, a reduction reaction in which methylene blue was decolorized in a slightly alkaline solution, and a precipitation reaction in which it formed a yellow precipitate of hydrazone by reaction with Bladishsche reagent (hydrazine reagent).

The two forms of the compound were separated from each other by fractional dissolution with ethanol.

The filtrate from the active charcoal contained thiocornine. Thiocornine in it might be separated from those amino acids that had been produced by the decomposition of peptide by precipitating it as phosphototungstic acid salt or other heavy metal salts because thiocornine was the only basic amino acid, but the process was expensive and was not free from appreciable loss so that the following alternative method was employed.

At first the filtrate was concentrated by evaporation to specific gravity 1.2–1.25 (60–70° C. under reduced pressure) and the pH was adjusted to 10–11 by adding caustic soda (or ammonia) under cooling and then adding of an adequate amount of ethanol produced curdy precipitate. Further addition of ethanol in an adequate quantity under stirring and still standing cool for a while, produced shapely needles or prisms of crystal. But since the free form is unstable and liable to be decomposed in a short time, the crystals were collected without delay and dissolved in dilute hydrochloric acid. The resulting solution, when evaporated gently, separated thiocornine hydrochloride. The yield was 1.2–1.5 g. The Ninhydrin reaction exhibited characteristic reddish yellow to reddish orange.

In addition to the above examples, the same process could be applied to beer pressed cake, bran of rice and wheat, residue of soy bean, etc., where these matters could be used without enzymatically decomposing glucoside of perfume ingredients, because they do not smell so badly as the genus Allium.

EXAMPLE 2

Process for preparing from materials of animal source (from organs of cattle, whales and other fish as well as skimmed milk)

In this case except for skimmed milk, organs were ground and aged at 380° C. for several hours for the purpose of enzymatic decomposition, especially of lypase action, then grease was removed with a solvent by the usual process. The degreased material was then treated with 60% methanol. The solvent methanol was recovered from the extract solution and the residue was brought into an aqueous solution. The ingredients were decomposed with sulfuric acid, and after the acid was removed the resulting solution was treated with active charcoal. By the same process as was described in the foregoing example, T.P.C. and thiocornine were collected from the charcoal adsorbent and the filtrate, respectively. The yield, which varied depending on the animal species and the locality, was greater than that from plant and was 10–15 g. and 3–5 g. for T.P.C. and thiocornine, respectively.

Alternatively the yield of T.P.C. and thiocornine in the process in which lactic acid was cultivated and the bacteria was used was in between the yields from animal and plant sources, that is 7–8 g. for T.P.C. and 2–4 g. for thiocornine.

EXAMPLE 3

Extraction from garlic, onion and the like.

Scordinine is subjected preliminarily to partial hydrolysis by 20% sulfuric acid or 15% (4 N) hydrochloric acid and thiocornyl-thiamamidine phosphoric acid cystine (called thiamacornine) is then isolated from the hydrolysate.

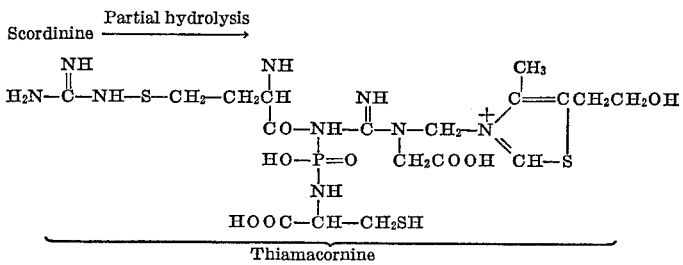

When the thiamacornine (thiocornyl-thiamamide phosphoric acid cystine) thus obtained is further treated with 30% $H_2SO_4$ or 6 N HCl so as to be completely hydrolzyed, it is disintegrated to thiocornine and T.P.C. As T.P.C. can be adsorbed on active carbon but thiocornine cannot be adsorbed, it is possible to separate the thiocornine and the T.P.C. from each other.

EXAMPLE 4

Extraction from milk casein or soya bean protein; direct isolation from the protein The protein is subjected to total hydrolysis by 6 N hydrochloric acid or 30% sulfuric acid. The hydrolyzate is then freed from the acid and concentrated by evaporation at low temperature under a substantially reduced pressure until it is concentrated into a syrupy matter having a specific gravity of 1.25–1.30. On the addition of ammonia or caustic alkali to this syrupy matter till a pH value of 4.5–4.0 is established, there is produced a large amount of precipitate, which contains besides thiocornine small amounts of other amino acids and about 20% of common salt (derived from the hydrochloric acid employed in the hydrolysis). Hereupon, the precipitate is dissolved in water (under warming) so that the concentration of the resulting solution may be estimated as about 30% and the solution is then left standing in a cold place, almost all the common salt being thereby crystallized. After removing the common salt crystals by filtration, the filtrate is subjected to gentle evaporation under reduced pressure, crystals of thiocornine being thereby separated. When the thiocornine is recrystallized from water, thiocornine dihydrochloride is obtained in a crystalline state (it is possible if desired to obtain thiocornine in the form of picrate).

EXAMPLE 5

Extraction from milk casein or soya bean protein; direct isolation from the protein The protein is subjected to total hydrolysis by 6 N hydrochloric acid. The hydrolyzate is freed from the acid and other impurities in accordance with the routine method, decolorized and concentrated under reduced pressure until the concentrate shows a specific gravity of 1.30–1.28. When the concentrate thus obtained is brought to pH 4.5–6.0 by the addition of caustic alkali, there is produced a large amount of precipitate which contains common salt derived from the hydrochloric acid employed and small amounts of other amino acids. The precipitate is dissolved in water under warming, of which the quantity is such that an aqueous solution is produced which has a concentration of about 25–30%. After the removal of insoluble matters by filtration, the filtrate is left standing in a cold place, a large amount of common salt crystals coming out of the solution. After removing the common salt crystals by filtration, the filtrate is gently evaporated under reduced pressure, the best part of the common salt being thereby once more thrown out of the solution (the saturated solution of common salt has a concentration of about 30%). The common salt crystals are removed again by filtration and the filtrate is concentrated by evaporation under reduced pressure, dihydrochloride of the thiocornine being thereby let out of the solution. When the thiocornine dihydrochloride is recrystallized from water, the final product which is of l-form has a $[\alpha]_D$ of $-12.5$ is obtained as octahedral crystals.

Scordinine A, parent substance of T.P.C. can be grouped into a closed type and an open type. The closed type scordinine A and the open type scordinine A can be separated from each other since the closed type is soluble in ethanol while the open type is soluble in a solvent of methanol and water (1:1). Each of thus separated closed type and open type scordinines is hydrolyzed and then subjected to fractional distillation to obtain closed type T.P.C. and open type T.P.C.

What is claimed is:

1. A process for preparing the amino acid, thiocornine, and the hydrochloride thereof, which comprises:

(a) treating a member selected from the group consisting of a plant of the genus Allium, beer yeast, degreased cattle and fish organs, skimmed milk, soya bean protein, milk casein and scordinine with hydrochloric acid or sulphuric acid to form a solution containing hydrolsyis products of said member;
    (b) neutralizing said solution with a base;
    (c) adding activated charcoal to said neutralized solution;
    (d) separating the charcoal from said neutralized solution by filtration;
    (e) bringing said neutralized solution to pH 11 and condensing to form a precipitate;
    (f) treating said precipitate with methanol or ethanol to form free thiocornine and recovering said free thiocornine or treating said thiocornine with hydrochloric acid to form the hydrochloride.

2. A process according to claim 1 wherein the starting material is selected from the group consisting of garlic and onion cloves which are extracted with 60% methanol, the extract being hydrolyzed with a sulfuric acid.

3. A process according to claim 1 wherein the starting material is degreased cattel or fish organs extracted with 60% methanol.

4. A porcess according to claim 1 wherein the starting material is scordinine.

5. A process according to claim 1 wherein the starting material is milk casein or soya bean protein.

6. A process according to claim 1 wherein the acid is neutralized by a member selected from the group consisting of ammonia, barium hydroxide and caustic soda.

7. A process according to claim 1 wherein free thiocornine is recovered.

8. A process according to claim 1 wherein the hydrochloride is recovered.

References Cited
UNITED STATES PATENTS

| | | | |
|---|---|---|---|
| 2,706,194 | 4/1955 | Morris et al. | 260—302 E |
| 3,626,003 | 12/1971 | Kominato et al. | 260—302 E |

OTHER REFERENCES

Cassidy: Technique of Organic Chemistry, V "Adsorption and Chromatography," Interscience, New York, 1951, pp. 122–3, 147–8, 177, 181–5, 190–2.

RICHARD J. GALLAGHER, Primary Examiner

U.S. Cl. X.R.

260—527 N